Patented Mar. 20, 1934

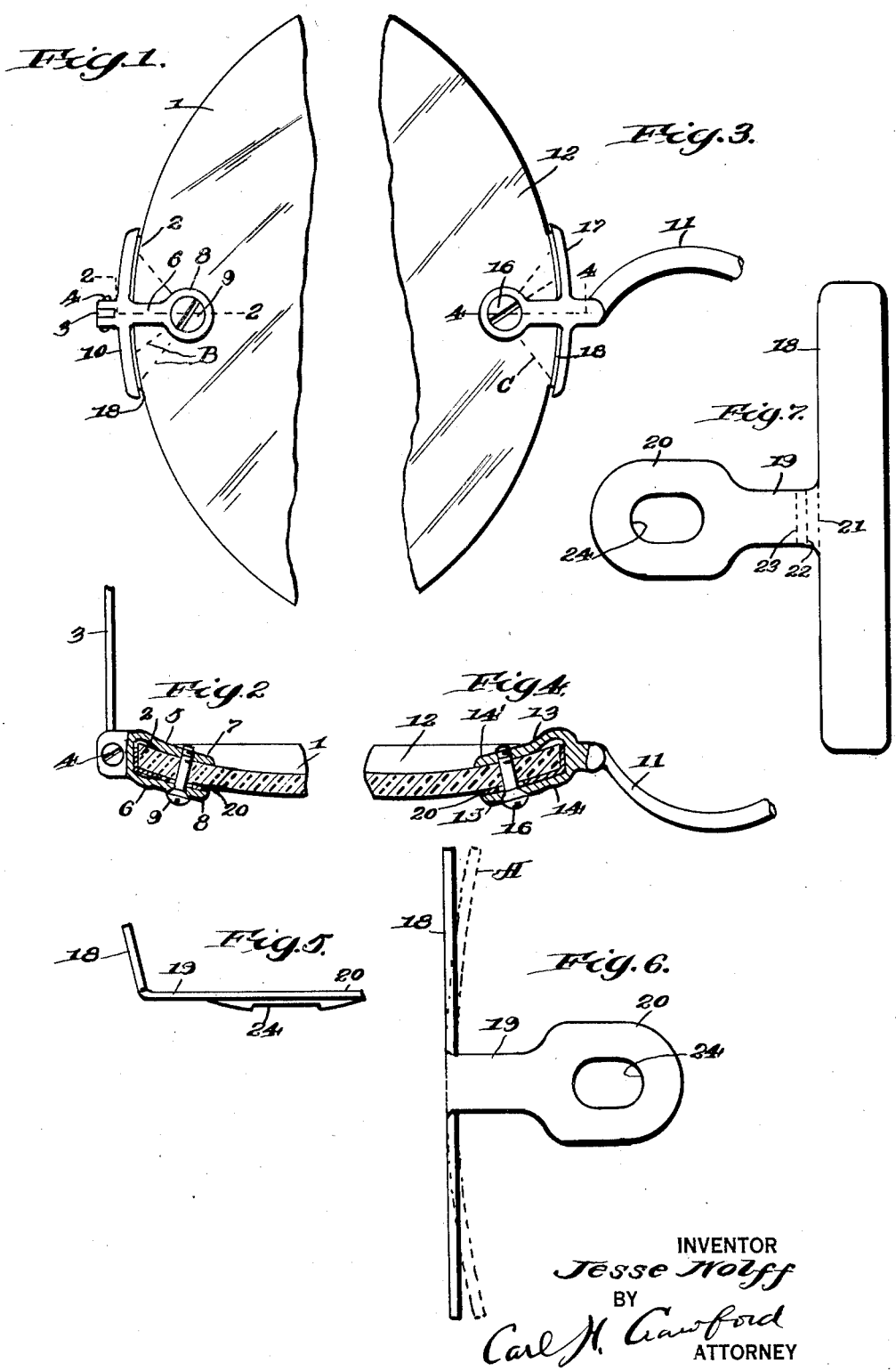

1,951,639

UNITED STATES PATENT OFFICE 1,951,639

LENS TAKE-UP DEVICE

Jesse Wolff, East Spokane, Wash.

Application December 5, 1931, Serial No. 579,209

4 Claims. (Cl. 88—47)

This invention relates to improved take up devices for either nose glasses or spectacles where the lenses are not bordered by rims and where connection with the frame and temple is made by a lens screw.

The invention resides in the improved take up device as an article of manufacture, either in the previously bent-up form or in the flat blank form, and also in combination with the bridge and temples, and also as an initial part of either of the latter when sold by the manufacturer.

One of the objects of this invention is to provide a take up device that may be incorporated in and with the flange and straps of the bridge or with the temples of spectacles, and secured by the lens screws, in such a manner as not only to perform its function but also in a manner to be invisible to the wearer or to anyone viewing the frames.

It is a feature of the invention to provide a take up device that will absorb any play lengthwise in the plane of the lens or in any angle to the major horizontal axis of the plane of the lens, or laterally thereof.

A further feature resides in an improved take up device that will at all times function to resist un-turning movement of the lens screws after the same have been tightened.

The invention has many other features and objects which will be more fully described in connection with the accompanying drawing and which will be more particularly pointed out in and by the appended claims.

In the drawing:—

Fig. 1 is an enlarged view looking toward the front of an outer edge portion of a lens coupled with a temple and having my improved device incorporated therewith.

Fig. 2 is a horizontal sectional view thereof on line 2—2 of Fig. 1.

Fig. 3 is an enlarged view looking toward the form of an inner edge portion of a lens showing the same connected with the bridge of eye glasses.

Fig. 4 is a sectional view on line 4—4 of Fig. 3.

Fig. 5 is an edge view of my improved take up device, bent to the form necessary for assembly with either of the studs previously shown. Fig. 6 is a view looking from the left of Fig. 5.

Fig. 7 is a plan view of the device in flat blank and finished form with the finger disposed in the plane of the spring leaf.

Like characters of reference designate similar parts throughout the different figures of the drawing.

First referring to Figs. 1 and 2, 1 designates a lens, or rather a fragment thereof, and for convenience in a later description, I will indicate edge 2, of lens 1, as that part of the lens which comes into active usage in connection with the device of this invention. In the nomenclature of the art, 3 is the temple or temple bar which is pivoted or hinged at 4, to what is generally termed the stud. This stud includes inner and outer straps 5 and 6 which extend on opposite sides of the lens 1. As shown, these stops have enlarged terminals or eyes 7 and 8, which are provided with bores for a lens screw 9. The bore in strap 6, in the present construction, will be a smooth bore and that in strap 5, will be threaded so that the lens screw 9 can be extended through the usual opening in the lens and turned home tightly to clamp the active edge or marginal portion of the lens between the straps 5 and 6. This stud also includes what is termed a flange 10, which as shown, extends in opposite directions along the edge 2 of the lens for edgewise engagement thereby, when the lens 1 is secured in position by the lens screw. These straps 5 and 6, while not flexible, are sufficiently pliable so that the operator can bend them sufficiently for engagement with lenses of different convexity, or concavity, or to fit lenses that are flat.

In Figs. 3 and 4, I have shown a stud of the same general form that is either integral or connected with a bridge 11, for eye glasses, a fragment of the lens being shown at 12. This stud likewise includes inner and outer straps 13 and 14 each having an enlarged eye, as shown at 15, and the inner eye is provided with a threaded bore and the outer eye with a smooth bore for a lens screw 16. The flange is indicated at 17.

Reference will next be made to that part of the structure, which in combination with the foregoing, and as an article of manufacture, constitutes the device of my invention.

In Figs. 5 to 7, I have shown the take up device detached from the studs, and in Figs. 5 and 6, I have shown the device bent to the general form in which it must be, to be assembled with a stud, and which bending operation may be performed by the retail user or by the factory. In Fig. 7, the completed article is shown in a flat blank form in which condition it may be supplied by the factory, if desired. However, in all other respects, the devices shown in Figs. 5 to 7 are identical in form and function and therefore the same reference characters will be applied thereto.

This device includes what I will term a spring leaf take up element 18, which as shown, consists of a strip of suitable material that is resilient, spring brass being one type of material that can be successfully employed although my invention is not restricted to any particular type of material. The length of this leaf 18 is substantially co-extensive with the length of the flange 10 or 17, it being just slightly shorter as shown in Figs. 1 and 3, to avoid any projection of the ends of the spring leaf 18 beyond the ends of the flange. The width of the leaf 18, will be slightly less than that of the flange, and the thickness of the leaf 18 will be so slight that it will be practically invisible when in place.

An important feature of this spring take up leaf 18 is that it may be initially shaped so that it will be under tension when interposed and engaged between the flange and that edge of the lens abreast of the flange, which in Fig. 1, is edge portion 2. In Fig. 6, in dotted lines A, I have shown the leaf 18 bent on a radius sufficiently different from that of the oval or circular lenses so that when it is engaged between the lens and flange, it will be flattened from its normal form. If the lens is of colonial form, thus presenting a straight edge to the flange, then the leaf 18 will be curved or shaped so that it will be flattened when disposed between the colonial lens edge and the flange.

This shaping of the leaf 18 may be done by the manufacturer when the device is sold to the retail operator, or the device may be sold by the manufacturer with the leaf 18 straight or flat, as shown in full lines in Fig. 6. The operator in fitting the device, can with his pliers, impart to the leaf 18 a sufficient change of form to insure tension when the leaf is located in position. Thus, this leaf will actively function to take up any play and will at all times stress the lenses outwardly from their flanges either in nose glasses or spectacles.

Extending laterally from the leaf 18, and substantially mid-way of its length, is a finger or shank 19, which, in the construction shown, is integral with said leaf 18 and hence is formed of the same resilient material as the latter. Said finger 19 terminates in a collapsible spring washer 20, which is somewhat enlarged with respect to the width of the shank 19.

In the present construction, said washer terminal is dished, as clearly shown in Fig. 5, and is provided with a substantially centrally disposed opening which is advantageously elongated coincident with the major or horizontal axis of the lens. This opening or bore permits of projection of the lens screw therethrough, as will be clearly seen in Fig. 2, and when the lens screw is turned home, the dished washer will flatten and be compressed under tension so as effectively to impose tension longitudinally of the lens screw and thereby resist unturning movement of the latter. This washer terminal will be preferably slightly less in size than the eyes 8 or 15, and as it will be interposed between one of the straps and the lens, it will be substantially invisible. Hence, it will now be clear that this bent up terminal, which may as shown, be in the form of a dished washer, will effectively function to prevent lens play that heretofore has resulted in the lens screw working loose. Such loose play necessitates the owner of the glasses going to a skilled operator so that the lens screw can be removed and then re-inserted after the flanges have been re-shaped.

The average individual cannot do this, and he has not at his command, a screw driver edge so minute as effectively to engage the slot in a lens screw, and in any event, the owner of the glasses would not take the risk of turning the lens screws too tightly.

Because of the difference in size of the frames, studs and lenses, it is desirable that the finger should have either a relatively short, long or medium length, and these different lengths may be afforded by bending the finger with respect to the spring leaf, either on lines 21, 22 or 23, as shown in Fig. 7. This is more readily effected if the device is sold to the retail user in the flat form shown in Fig. 7, although it is clearly possible to change the line of bend if the device is sold in the form shown in Fig. 5, as the operator can use pliers for this purpose.

Either in the form shown in Figs. 5 and 6, or in Fig. 7, the device may be secured to the mounts by inserting the lens screws through the straps and through the bore in the finger so that the entire structure will be connected and sold as a unit. This follows from the fact that in most cases, the mounts are sold without lenses, by the manufacturer or jobber, to the retail buyer.

Reference has been made to the bore or opening in the washer terminal of the finger, and which opening is indicated at 24, and it is a distinct advantage to have this opening either larger than the diameter of the lens screw, as it is here shown, but it is a further advantage to have the opening 24 elongated horizontally, with respect to its normal position on the mounting. When I state that these are advantageous forms, I do not mean that they are absolutely essential to the successful use of the invention. The diametrical enlargement of the opening 24, avoids the necessity of the same extreme accuracy of fit as is necessary with respect to the lens and its flange and hence, with reasonable accuracy in drilling the hole in the lens, the operator can be assured that he can fit the washer so that the lens screw can be inserted therethrough after the lens is fitted to the mount.

The advantage of the elongation resides in the fact that the operator can change the length of the finger, as heretofore described, and be assured that he can insert the lens screw through the elongated bore 24 because it is elongated in the same direction in which the length of the finger is changed by bending on the different lines noted, and the range or limit to which the length of the finger may be changed is clearly overbalanced by the extent to which the opening 24 is elongated.

It will now be clear that in one integral structure, I have provided means for taking up play in the plane of the lens, as by the take up leaf 18, and I have also provided means for cushioning shock transversely of the plane of the lens, and in fact, at any angle thereto, by means of the spring washer 20. In addition to absorbing shock, the spring washer 20 also serves to resist unturning movement of a tightened lens screw thereby preventing play that inevitably results from a loose lens screw.

It will also be clear that the take up leaf 18 can perform its function without interference from the washer 20 by reason of the fact that the bore of the washer is not tight about the shank of the lens screw. It is further clear, that the washer 20 is free to perform its function of cushioning shock and preventing unturning movement of the lens screw without interference from the take up leaf 18.

There are several causes for breakage of lenses which are rimless but one of the most, or among the most prevalent, are tightening of the lens screws too tight, inaccuracy of location of the drill hole in the lens, and roughly wiping the lens, as well as sudden extreme temperatures.

Whatever may be the cause of breakage, it has been found by experience, that in most cases, unless the glasses have been dropped and shattered, that breakage occurs along dotted lines indicated at B and C, in Figs. 1 and 3, and broadly on lines radiating from the lens screw outwardly toward the edges of the lens and toward the flanges.

It will be understood that these flanges 10 and 17, are sometimes very stiff, and in some mountings they are relatively soft and pliable, but they can readily be bent by the usual pliers so that end portions of the flanges can be bent or shaped inwardly to obtain contact with the edge of the lens. However, when the ends of the flanges are bent inwardly, the central portions of the flanges that are integral with the studs, remain constant. Hence, when the ends of the flanges are bent inwardly to insure engagement with the edge of the lens, there will be a central space out of contact with the lens edge, and therefore, there will not be continuous engagement between the lens edge and the flange, and this continuous contact is of the utmost importance in preventing loosening of the lens screws.

Further, the slightest inaccuracy is a snug and nicely fitted lens imposes stress on the latter when the lens screw is turned home sufficiently tight, and this not only promotes but often directly causes breakage of the lens.

With the device of my invention, any inaccuracy in locating the drill hole in the lens that may require bending of the flanges, will be compensated for by the take up leaf since the latter is interposed between the flange and lens edge under tension, and hence insures continuous engagement.

If you have continuous contact, then the lens screw will rarely work out or loose because this continuous contact eliminates play of the lens with respect to its flange.

It will now be clear that I have provided two distinct but coacting means for resisting the working loose of the lens screw, namely, the take up leaf 18 and the spring washer 20.

Because of the yielding action of the washer terminal 20, the lens screw need not be tightened sufficiently to impose a dangerous stress on the lens.

The public dislikes rim glasses of any kind and would much prefer the rimless type if the danger of breakage could be eliminated, and it is the object of this invention to provide a mechanical take up and absorption of stresses at the connection of the lens with the studs so that rimless glasses can be worn with the same degree of safety against breakage that is possible with rimmed glasses.

With the device of this invention, I can employ a rigid bridge or mounting and thereby insure alinement.

It is believed that the device of this invention will be fully understood from the foregoing description, and while I have herein shown and described specific forms of the invention, I do not wish to be limited thereto except for such limitations as the claims may import.

I claim:—

1. As a new and useful article of manufacture, of the class described, a lens take up device for a lens mount comprising a spring take up leaf adapted to be disposed between a lens flange and an edge of a lens and shaped to be tensioned transversely of its length when said leaf is engaged between a flange and lens edge, and said leaf having a finger extending at substantially right angles from one side edge of said leaf and substantially mid way of the length of the latter and said finger having a dished spring terminal provided with a lens screw bore and adapted to be flattened to impose tension longitudinally of the screw to resist unturning movement of the latter.

2. As a new and useful article of manufacture of the class described, a lens take up device for a lens mount comprising a spring leaf take up adapted to be interposed between a lens flange and an edge of a lens and shaped to be tensioned when said leaf is engaged therebetween, and said leaf having a finger projecting at an angle therefrom and said finger having a raised spring washer terminal adapted to be flattened and thereby tensioned to resist unturning movement of a lens screw.

3. As a new and useful article of manufacture of the class described, a finished article lens take up blank adapted to be bent to the desired form by the user, comprising, a sheet of spring metal shaped to form a spring leaf take up adapted to be disposed between the flange and an edge of the lens and adapted to be bent by the user so as to be tensioned when said leaf is engaged between the flange and an edge of the lens, and said leaf having a finger projecting in the plane thereof and adapted to be bent up at an angle to said leaf by the user to provide the necessary length of finger, and the terminal end of said finger having a spring washer bent out of the plane of said finger and adapted to be flattened when a lens screw is turned home to resist unturning movement of the screw.

4. In a take up device for a lens mount, a spring take up leaf adapted to be inserted between the flange and a lens edge, and a finger formed integral with said leaf and lengthwise proportioned to be bent up therefrom on different lines of bend to alter the length of said finger, and said finger having a spring dished washer terminal having a bore that is elongated in the direction of the length of said finger, whereby said bore will register with the screw opening in the lens when the effective length of said finger is changed.

JESSE WOLFF.